Feb. 23, 1932. W. L. PAUL 1,846,652
PLOW
Filed Dec. 8, 1928
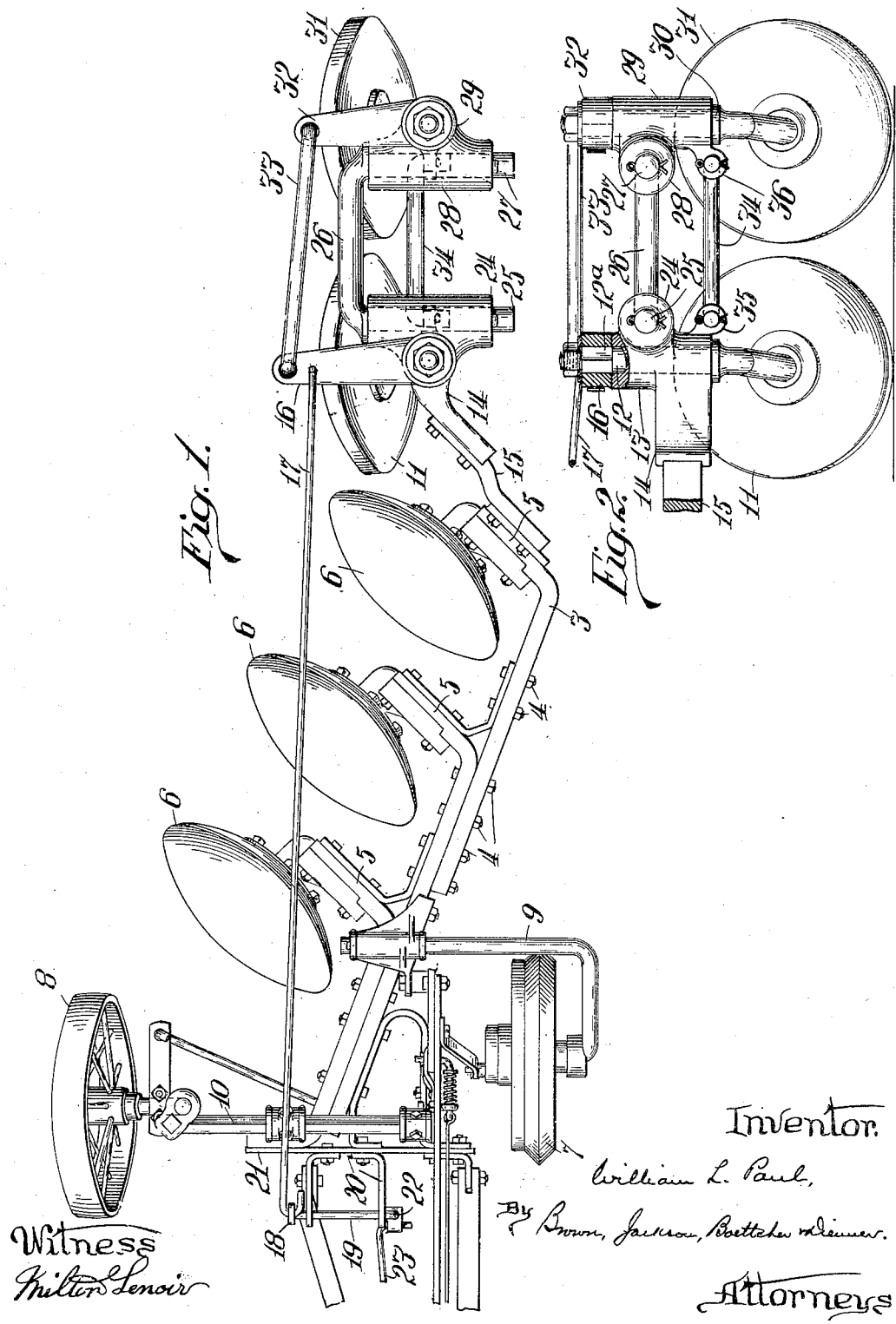

Patented Feb. 23, 1932

1,846,652

UNITED STATES PATENT OFFICE

WILLIAM L. PAUL, OF BERKELEY, CALIFORNIA, ASSIGNOR TO DEERE & COMPANY, OF MOLINE, ILLINOIS, A CORPORATION OF ILLINOIS

PLOW

Application filed December 8, 1928. Serial No. 324,760.

This invention has to do with plows of the disc type comprising a beam or frame to which one or more plowing discs are secured, the usual land and front furrow wheels, and a rear furrow wheel. In disc plows there is a tendency of the discs to move landward in plowing, as there is no landside, or sharply defined furrow wall, to hold the discs to their work, and it is customary to provide a rear furrow wheel that is secured to the beam or frame and runs in the furrow back of the rear disc, to hold the plow against such landward movement. In some disc plows provision is made for steering the rear furrow wheel, either separately or in unison with the front furrow wheel, and in others the rear furrow wheel is not steered. My present invention is applicable to either form, but in the present instance I have shown it applied to a disc plow in which the rear furrow wheel is steered by the draft power, such as a tractor or team, substantially as shown and described in my U. S. Patent No. 1,702,615, issued Feb. 19, 1929.

In the operation of disc plows it is not unusual for the rear disc or discs to jump up for one cause or another, as where a disc suddenly encounters unusual resistance, or because of the influence of the draft of the tractor, and this upward movement of the rear disc or discs lifts the rear portion of the frame, which lifts the rear furrow wheel and, with the constructions heretofore used, frequently causes it to run out of the furrow, or up on the landward side of it. This permits the plow to skid landward, which breaks the continuity of the furrow being formed, and breaks down the furrow wall, with the result that plowing the next time around is made more difficult. To provide a construction by which this difficulty is avoided is the principal object of my present invention, but it also has for its object the provision of improved means for holding the plow against landward movement during the normal operation of the plowing discs, and for steering the plow. I accomplish these objects as illustrated in the accompanying drawings and as hereinafter described. What I regard as new is set forth in the claims.

In the accompanying drawings,—

Fig. 1 is a plan view of a disc plow embodying my improvements; and

Fig. 2 is a partial side elevation, with some parts in section.

The plow shown, with the exception of my present improvements, is substantially the same as that shown and described in my pending application hereinbefore mentioned, but it is to be understood that the improvements that constitute the subject-matter of this application are not limited in their application to the particular plow shown, as they may well be applied to various other forms of disc plows.

The construction illustrated is one in which the rear furrow wheel is arranged to be steered, but certain features of the improvements hereinafter described may be applied to disc plows in which the rear furrow wheel is not steered, as will be manifest from the description thereof.

The plow illustrated comprises a diagonally disposed beam or frame 3, preferably of the built-up type made up of a number of metal bars secured together in any suitable way, as by rivets 4, to constitute a strong rigid structure. This frame is provided with a sufficient number of laterally extending arms 5 to support the required number of plowing discs 6 in diagonally spaced relation to each other, according to the usual practice. The number of discs is, of course, optional, and it should be understood that one or more may be provided.

The front portion of the frame is supported by a land wheel 7 and a front furrow wheel 8, mounted respectively on transversely disposed axles 9, 10, secured to and projecting from opposite sides of the frame at the forward portion thereof. In the present instance the front furrow wheel 8 is not dirigibly mounted, but a dirigible front furrow wheel may be provided if desired.

The rear portion of the frame is supported upon a rear furrow wheel 11 that is provided with a vertical spindle 12 journaled in a bearing 13 that is carried by a bracket 14, as best shown in Fig. 2. This bracket is rigidly secured to a bar 15 that constitutes the rear portion of the frame and projects furrowward, so that the spindle 12 is propely positioned to permit the furrow wheel 11 to travel in the furrow back of the rear disc 6.

In accordance with the usual practice the function of the rear furrow wheel 11 is to hold the rear portion of the plow against landward movement, and thereby hold the discs to their work. In the illustrated construction the spindle 12 is squared at its upper end, as shown at 15 in Fig. 2, and carries a laterally projecting arm 16 which may be swung back and forth to steer the rear furrow wheel 11. For so swinging said arm it is connected by a rod 17 with an upwardly projecting arm 18 carried by a rock shaft 19 that is mounted in brackets 20 fixedly secured to a transverse bar 21 that is attached to the front portion of the frame. The rock shaft 19 extends transversely of the plow and has a depending arm 22 to which is connected an operating rod 23 arranged to be moved back and forth by lateral swinging of the draft connections, as fully described in my copending application hereinbefore referred to. As the particular means by which the arm 16 is actuated to steer the rear furrow wheel have nothing to do with my present invention it is believed to be unnecessary to further describe the steering connections.

The structure thus far described is old, and I now come to the features of improvement with which this application is concerned.

By reference to the drawings it will be seen that the bracket 14 is provided with a transversely disposed sleeve 24 that is preferably located back of the spindle 12 and near the upper end thereof. This sleeve forms a bearing for one arm 25 of a U-shaped yoke, the intermediate portion 26 of which extends rearwardly and connects the arm 25 with a similar arm 27 that is parallel with the arm 25, and is spaced rearwardly therefrom.

The arm 27 is journaled in a sleeve 28 similar to and parallel with the sleeve 24. The sleeve 28 is preferably formed integral with a vertical sleeve 29 that forms a bearing for the vertical spindle 30 of another rear furrow wheel 31 that is in tandem relation to the rear furrow wheel 11, and is preferably located to trail behind it, as best shown in Fig. 1. Thus the U-shaped yoke constitutes a laterally rigid link that connects the furrow wheel 31 with the furrow wheel 11 and plow frame so as to permit relative up and down movement of said wheels, and meanwhile hold them against relative lateral movement. The spindle 30 is provided at its upper end with a laterally projecting arm 32 that is disposed in parallelism with the arm 16 and is pivotally connected therewith by a link 33. Thus, by steering the rear furrow wheel 11, the rear furrow wheel 31 is also steered in the same direction and to the same extent.

By mounting the furrow wheel 31, as by the means described, so that the two rear furrow wheels are held in line, but are capable of up and down movement with respect to and independently of each other, notwithstanding the fact that the furrow wheel 11 moves up and down with the rear portion of the plow frame, such up and down movement does not affect the trailing furrow wheel 31, which is constantly held in engagement with the ground under the action of gravity, notwithstanding any such up and down movement of the furrow wheel 11 and the frame. It is evident, therefore, that even if the rear furrow wheel 11 should jump up, for any reason, so as to lessen its traction on the ground, the rear furrow wheel 31 will nevertheless remain in its normal operative position and will hold the plow and the furrow wheel 11 against lateral skidding. Consequently, the plowing discs are always held properly to their work.

Inasmuch as the furrow wheel 31 is held against lateral movement with respect to the furrow wheel 11 and the plow frame, it aids and assists the first furrow wheel 11 in holding the frame in position while the discs are operating normally, and, therefore, improves the operation of the plow, not only under such conditions, but also when the furrow wheel 11 is thrown upward from its normal position, as has been explained. Also, the steering of the furrow wheel 31 supplements the steering action of the furrow wheel 11 and aids in steering the plow.

To aid in holding the vertical spindles of the furrow wheels 11 and 31 in a perpendicular position, the bearing sleeves 13 and 29 are connected by a second U-shaped yoke 34 similar to and parallel with the yoke 26, and connected with said sleeves in a similar manner. As best shown in Fig. 2, the ends of the yoke 34 are journaled in ears 35, 36 that project from the sleeves 13 and 29 at points lower down than the sleeves 24, 28. Thus the two yokes 26, 34 swing in parallelism with each other and hold the vertical spindles of the two furrow wheels 11 and 31 in parallelism with each other.

It will be noted that in the construction illustrated the link 33 is slightly longer than the yokes 26, 34, because of the relative position of the sleeves 13, 29, and with this arrangement the ends of the link 33 are fitted somewhat loosely in the holes in the ends of the arms 16, 32 which receive them, so that the link 33 will not resist relative vertical movement of the rear furrow wheels under the control of the yokes or links 26, 34. In some cases, however, it may be desirable to use a tighter connection between the link 33 and the arms 16, 32, in which case said arms should be arranged so that the link 33 may be made of substantially the same length as the yokes 26, 34.

While I prefer to connect the furrow wheel 31 with the plow frame by means of the U-shaped yokes 26 and 34, as shown and described, any other equivalent connection by which the furrow wheel 31 is held against lateral swinging with relation to the plow frame and is left free to maintain its relation to the ground notwithstanding upward movement of the frame or the furrow wheel 11, may be employed. Also, instead of making the part 31 in the form of a wheel, any other form of ground engaging member suitable for the purpose of holding the frame against landward movement when the furrow wheel 11 becomes ineffective to a greater or less extent for that purpose may be used.

I believe my invention to be generic in character, and the claims hereinafter made are, therefore, to be construed accordingly.

I claim:

1. A disc plow comprising a frame, plowing discs carried thereby, a rear furrow wheel, and ground engaging means arranged to follow said furrow wheel, and cooperating therewith to resist landward movement of the plowing discs.

2. A disc plow comprising a frame, plowing discs carried thereby, a rear furrow wheel connected with said frame, and means separate from said plowing discs constantly engaging in the furrow to resist landward movement of the plowing discs regardless of up and down movement of said furrow wheel.

3. A disc plow comprising a frame, plowing discs carried thereby, a rear furrow wheel connected with said frame, and means connected with the frame to follow behind said furrow wheel in constant engagement with the ground, to resist landward movement of the plowing discs regardless of up and down movement of the furrow wheel.

4. A disc plow comprising a frame, plowing discs carried thereby, and a plurality of furrow wheels at the rear of the plow in tandem relation to each other for resisting landward movement of the plowing discs.

5. A disc plow comprising a frame, plowing discs carried thereby, and a pluraltiy of furrow wheels at the rear of the plow in tandem relation to each other, one of said wheels being supported for independent up and down movement with respect to the other.

6. A disc plow comprising a frame, plowing discs carried thereby, a plurality of furrow wheels at the rear of the plow in tandem relation to each other for resisting landward movement of the discs when plowing, and means for steering said wheels in unison.

7. A disc plow comprising a frame, plowing discs carried thereby, a plurality of furrow wheels at the rear of the plow in tandem relation to each other, one of said wheels being supported for independent up and down movement with respect to the other, and means for steering said wheels in unison.

8. A disc plow comprising a frame, plowing discs carried thereby, a rear furrow wheel supporting the rear portion of said frame, and a ground engaging wheel connected with the frame to hold the same against landward movement, said ground engaging wheel being movable up and down with respect to said furrow wheel.

9. A disc plow comprising a frame, plowing discs carried thereby, a furrow wheel supporting the rear portion of said frame, vertically swinging means connected with the rear portion of the frame to swing vertically and held against lateral movement, and a ground engaging wheel connected with said vertically swinging means to travel in the furrow.

10. A disc plow comprising a frame, plowing discs carried thereby, a rear furrow wheel supporting the rear portion of said frame, a trailing wheel back of said furrow wheel, and vertically swinging means connecting said tailing wheel with the frame and operating to prevent landward movement of said frame with respect to said trailing wheel.

11. A disc plow comprising a frame, plowing discs carried thereby, a furrow wheel supporting the rear portion of said frame and having swivel connection therewith, a link connected with the rear portion of the frame to swing vertically and held against lateral movement, a furrow wheel having a swivel connection with said link and arranged to travel in the furrow back of said furrow wheel, and steering means connected with said wheels to steer them in unison.

12. A disc plow comprising a frame, plowing discs carried thereby, a furrow wheel supporting the rear portion of said frame and having swivel connection therewith, a link connected with the rear portion of the frame to swing vertically and held against lateral movement, a furrow wheel having a swivel connection with said link and arranged to travel in the furrow back of said furrow wheel, draft connections at the front of said frame, and means connected with said draft connections and with said wheels for steering the same in unison.

13. A disc plow comprising a frame, plowing discs carried thereby, a furrow wheel supporting the rear portion of said frame, a U-shaped link connected with the rear portion of the frame to swing vertically and held against lateral movement, and a furrow wheel connected with said link to travel in the furrow back of said furrow wheel.

14. A disc plow comprising a frame, plowing discs carried thereby, a rear furrow wheel connected with said frame, and ground engaging means adjacent to and disposed in substantially the plane of said furrow wheel and cooperating therewith to resist landward movement of the plowing discs.

WILLIAM L. PAUL.